(12) United States Patent
Seo

(10) Patent No.: US 12,531,119 B2
(45) Date of Patent: Jan. 20, 2026

(54) METHOD FOR LAYOUT AWARE OPTIMIZATION FOR 10T NOR-TYPE CAM CELL

(71) Applicant: Inha University Research and Business Foundation, Incheon (KR)

(72) Inventor: Yeongkyo Seo, Incheon (KR)

(73) Assignee: Inha University Research and Business Foundation, Incheon (KR)

( * ) Notice: Subject to any disclaimer, the term of this patent is extended or adjusted under 35 U.S.C. 154(b) by 198 days.

(21) Appl. No.: 18/236,794

(22) Filed: Aug. 22, 2023

(65) Prior Publication Data

US 2024/0321357 A1    Sep. 26, 2024

(30) Foreign Application Priority Data

Mar. 23, 2023    (KR) .......................... 10-2023-0038005

(51) Int. Cl.
*G11C 15/04* (2006.01)

(52) U.S. Cl.
CPC .................................. *G11C 15/04* (2013.01)

(58) Field of Classification Search
CPC ...................................................... G11C 15/04
See application file for complete search history.

(56) References Cited

U.S. PATENT DOCUMENTS

| 6,803,610 | B2 * | 10/2004 | Koolhaas | ............... | H10D 89/10 |
| | | | | | 365/49.17 |
| 9,036,404 | B2 * | 5/2015 | Liaw | ...................... | H10B 10/12 |
| | | | | | 365/156 |
| 2004/0061143 | A1 * | 4/2004 | Koolhaas | ............... | H10B 10/12 |
| | | | | | 257/E27.099 |
| 2004/0240277 | A1 * | 12/2004 | Hanzawa | ............. | G11C 15/043 |
| | | | | | 365/189.07 |
| 2007/0097723 | A1 * | 5/2007 | Sachan | .................. | H10B 10/00 |
| | | | | | 257/E27.098 |
| 2007/0257277 | A1 * | 11/2007 | Takeda | ................. | H10B 10/125 |
| | | | | | 438/129 |
| 2013/0258759 | A1 * | 10/2013 | Liaw | ...................... | G06F 30/392 |
| | | | | | 257/E21.53 |

FOREIGN PATENT DOCUMENTS

| JP | 2000100177 A | 4/2000 |
| KR | 1019950011636 | 10/1995 |
| KR | 1020180028020 | 3/2018 |

OTHER PUBLICATIONS

Office Action for related KR Application No. 10-2023-0038005 issued Jul. 24, 2024 (7 pgs.).

* cited by examiner

*Primary Examiner* — Jay W. Radke
(74) *Attorney, Agent, or Firm* — ArentFox Schiff LLP; Joseph M. Maraia

(57) ABSTRACT

Disclosed is a layout structure of a 10T NOR-type CAM including a first CAM cell, a second CAM cell, a third CAM cell, and a fourth CAM cell, in which the first CAM cell and the third CAM cell share search line 1 (SL1) and bit line 1 (BL1), and the second CAM cell and the fourth CAM cell share SL0 and BL0, the first CAM cell and the second CAM cell share match line 1 (ML1) and word line 1 (WL1), and the third CAM cell and the fourth CAM cell share ML0 and WL0, and an active contact is shared between the first CAM cell and the third CAM cell and another active contact is shared between the second CAM cell and the fourth CAM cell share.

1 Claim, 16 Drawing Sheets

FIG. 1B

| Entry No. | Address (Binary) | Output Port |
|-----------|------------------|-------------|
| 1 | 101XX | A |
| 2 | 0110X | B |
| 3 | 011XX | C |
| 4 | 10011 | D |

(PRIOR ART)

(PRIOR ART)

METHOD FOR LAYOUT AWARE OPTIMIZATION FOR 10T NOR-TYPE CAM CELL

CROSS-REFERENCE TO RELATED APPLICATION

This application claims the priority benefit of Korean Patent Application No. 10-2023-0038005, filed on Mar. 23, 2023, in the Korean Intellectual Property Office, the disclosure of which is incorporated herein by reference.

BACKGROUND

1. Field of the Invention

The following example embodiments relate to a method and system for layout aware optimization for a 10T NOR-type content addressable memory (CAM) cell.

This work was supported in part by the MSIT (Ministry of Science and ICT), Korea, under the ITRC (Information Technology Research Center) support program (IITP-2021-0-02052) supervised by the IITP (Institute for Information & Communications Technology Planning & Evaluation).

This work was supported in part by the National Research Foundation of Korea (NRF) under Grant NRF-2021M3F3A2A01037531 funded by the Korean government (MSIT).

This work was supported in part by the Next Generation Semiconductor R&D Program (No. 20009972) funded by the Ministry of Trade, Industry & Energy (MOTIE, Korea).

2. Description of the Related Art

A content addressable memory (CAM) refers to a memory having a plurality of CAM cells to store data and represents a memory that is configured to receive data as an input and to output an address at which the data is stored. The CAM is used in various application fields that require a high-speed search, such as a search engine in a network router, image processing, and a neural network.

The CAM may be classified into a binary CAM and a ternary CAM (TCAM) according to a data storage method. The binary CAM is configured such that each CAM cell may store state information of one of two states, a logic '1' state and a logic '0' state. On the contrary, the TCAM is configured such that each CAM cell may additionally store an 'X' (don't care) state in addition to the logic '0' state and the logic '1' state. The TCAM has an advantage of being able to provide flexibility in search by allowing the 'X' state to be additionally stored.

Conventionally, the CAM is implemented as a volatile device, a complementary metal-oxide semiconductor (CMOS), or a non-volatile device, a magnetic tunnel junction (MTJ) and a resistive read access memory (ReRAM). The CAM implemented as the CMOS requires a plurality of transistors (e.g., 16T) and also requires a large scale and has a limitation in that data is lost when power is not applied. The MTJ CAM requires fewer transistors (10T-4MTJ) than the CMOS, but still requires a large number of devices and has a low search accuracy due to characteristics of an MTJ device that an ON/OFF ratio is low. The ReRAM CAM may significantly reduce the number of devices compared to the MTJ CAM, but has a low ON/OFF ratio, which is similar to the MTJ CAM.

Therefore, there is a continuing demand for a CAM that may be highly integrated in a small area with a small number of devices and has high search accuracy.

SUMMARY

To solve an issue that, in the case of a 10T content addressable memory (CAM), an area is large since a large number of transistors are quired and the area further increases since a poly-to-poly distance is required for left-right cells and an active-to-active distance is required for upper-lower cells, a technical subject of example embodiments is to provide a layout structure for reducing a horizontal area through poly contact share and a reducing a vertical area through active contact share.

According to an aspect, a layout structure of a 10T NOR-type CAM proposed herein includes a first CAM cell, a second CAM cell, a third CAM cell, and a fourth CAM cell, and, here, the first CAM cell and the third CAM cell share search line 1 (SL1) and bit line 1 (BL1), and the second CAM cell and the fourth CAM cell share search line 0 (SL0) and bit line 0 (BL0), the first CAM cell and the second CAM cell share match line 1 (ML1) and word line 1 (WL1), and the third CAM cell and the fourth CAM cell share match line 0 (ML0) and word line 0 (WL0), and an active contact is shared between the first CAM cell and the third CAM cell and another active contact is shared between the second CAM cell and the fourth CAM cell.

According to a first example embodiment, an active-to-active distance is not required between the first CAM cell and the third CAM cell and between the second CAM cell and the fourth CAM cell through upside-down reversal of a layout arrangement that enables active contact share.

According to another aspect, a layout structure of a 10T NOR-type CAM proposed herein includes a first CAM cell, a second CAM cell, a third CAM cell, and a fourth CAM cell, and, here, the first CAM cell and the second CAM cell share ML1 and WL1, and the third CAM cell and the fourth CAM cell share ML0 and WL0, the first CAM cell and the third CAM cell share SL1 and BL1, and the second CAM cell and the fourth CAM cell share SL0 and BL0, and a poly contact is shared between the first CAM cell and the second CAM cell and another poly contact is shared between the third CAM cell and the fourth CAM cell.

According to a second example embodiment, a poly-to-poly distance is not required between the first CAM cell and the second CAM cell and between the third CAM cell and the fourth CAM cell through left-right reversal of a layout arrangement that enables poly contact share.

According to still another aspect, a layout structure of a 10T NOR-type CAM proposed herein includes a first CAM cell, a second CAM cell, a third CAM cell, and a fourth CAM cell, and, here, the first CAM cell and the third CAM cell share SL1 and BL1, and the second CAM cell and the fourth CAM cell share SL0 and BL0, the first CAM cell and the second CAM cell share ML1 and WL1, and the third CAM cell and the fourth CAM cell share ML0 and WL0, an active contact is shared between the first CAM cell and the third CAM cell and another active contact is shared between the second CAM cell and the fourth CAM cell, and a poly contact is shared between the first CAM cell and the second CAM cell and another poly contact is shared between the third CAM cell and the fourth CAM cell.

According to a third example embodiment, an active-to-active distance is not required between the first CAM cell and the third CAM cell and between the second CAM cell and the fourth CAM cell through upside-down reversal of a layout arrangement that enables active contact share, and a poly-to-poly distance is not required between the first CAM cell and the second CAM cell and between the third CAM cell and the fourth CAM cell through left-right reversal of a layout arrangement that enables poly contact share.

According to some example embodiments, to solve an issue that, in the case of a 10T CAM, an area is large since a large number of transistors are quired and the area further increases since a poly-to-poly distance is required for left-right cells and an active-to-active distance is required for upper-lower cells, it is possible to provide a layout structure for reducing device area by reducing device size in a horizontal direction (reducing a horizontal area) through poly contact share and reducing device area by reducing device size in a vertical direction (reducing a vertical area) through active contact share.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 1A, 1B, 1C, and 1D illustrate examples of describing a 10T content addressable memory (CAM) cell according to an example embodiment;

DETAILED DESCRIPTION

Figure 1A:
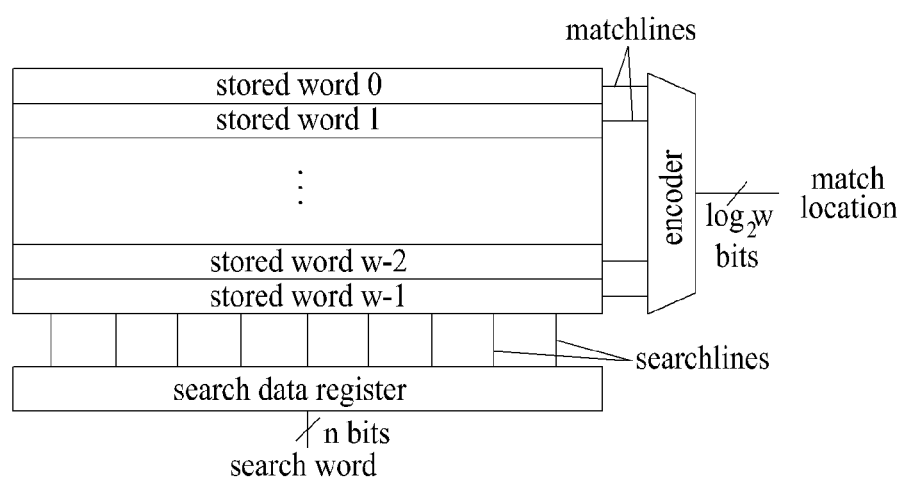

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments are described with reference to the accompanying drawings.

FIGS. 1A, 1B, 1C, and 1D illustrate examples of describing a 10T content addressable memory (CAM) cell according to an example embodiment.

FIG. 1A is a conceptual diagram illustrating a CAM cell according to an example embodiment.

A CAM refers to a memory having a plurality of CAM cells to store data and represents a memory that is configured to receive data as an input and to output an address at which the data is stored.

FIG. 1B is a table showing an address and an output port of a CAM according to an example embodiment.

The CAM may be classified into a binary CAM and a ternary CAM (TCAM) according to a data storage method. The binary CAM is configured such that each CAM cell may store state information of one of two states, a logic '1' state and a logic '0' state. On the contrary, the TCAM is configured such that each CAM cell may additionally store an 'X' (don't care) state in addition to the logic '0' state and the logic '1' state. The TCAM has an advantage of being able to provide flexibility in search by allowing the 'X' state to be additionally stored.

Figure 1C:
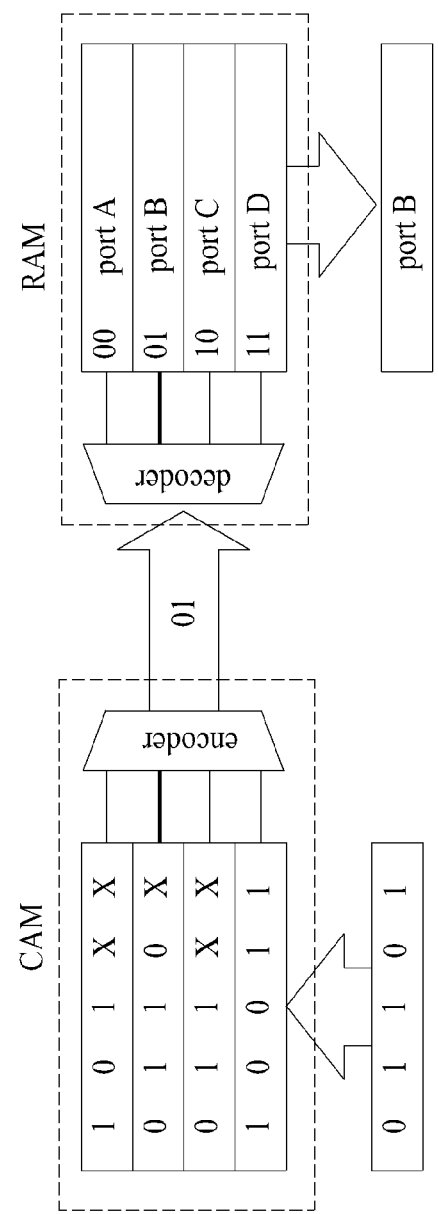

FIG. 1C illustrates output data according to an input address between a CAM and random access memory (RAM) according to an example embodiment.

The CAM according to an example embodiment is an essential memory that may quickly search for a desired address that is stored in a cache through parallel processing.

Referring to FIG. 1C, if an input address is present in the cache, hit occurs to access RAM and to read corresponding data, and if the input address is absent in the cache, miss occurs to access a next memory hierarchy.

Figure 1D:
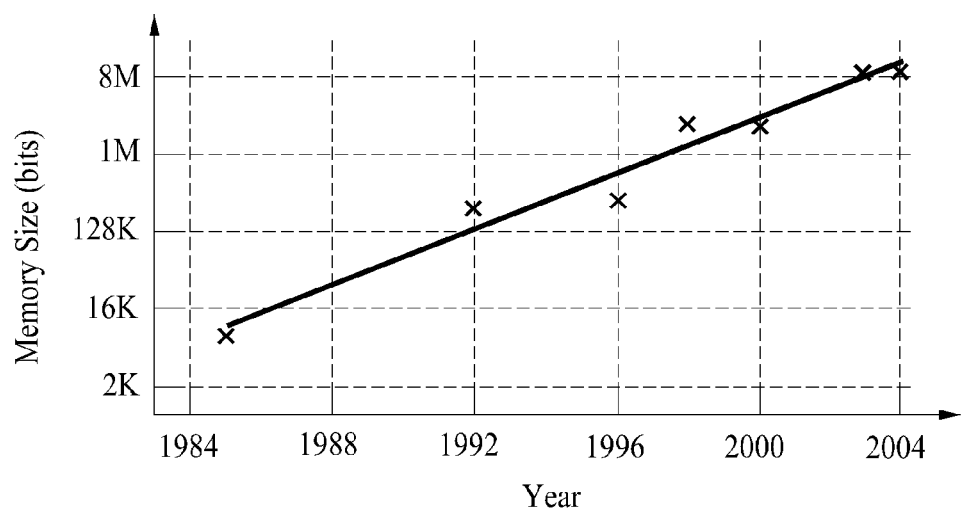

FIG. 1D is a graph showing recent capacity increase trend of a CAM according to an example embodiment.

Referring to FIG. 1D, capacity of a CAM and a memory required significantly increases over time. Therefore, there is a continuing demand for a CAM that may be highly integrated in a small area according to an increase in the capacity of the CAM and has a high search accuracy.

Figure 2:
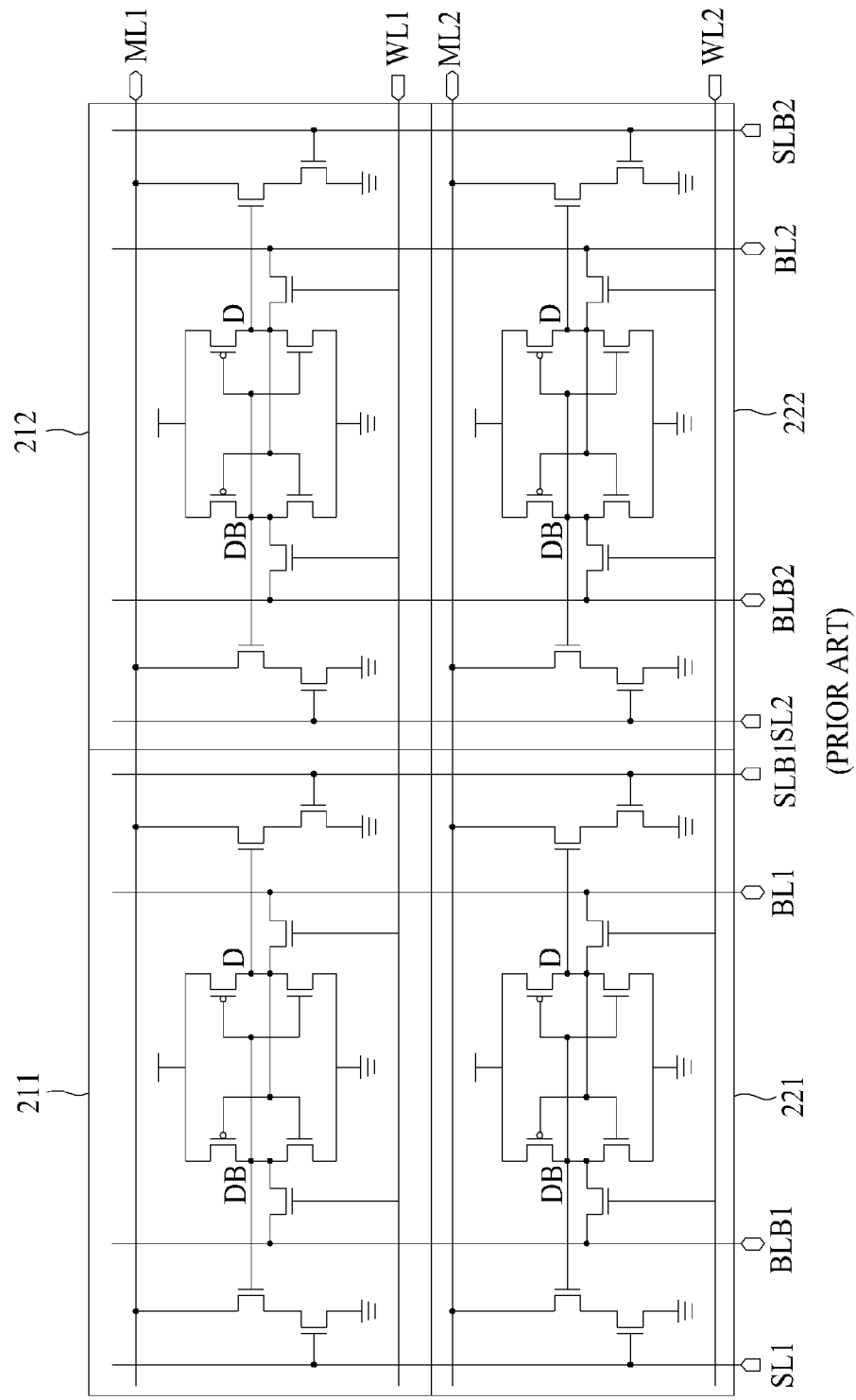
FIG. 2 illustrates a 10T-based NOR type CAM circuit structure according to the related art.

FIG. 2 illustrates a 10T-based NOR type CAM circuit structure according to the related art.

Referring to FIG. 2, a 10T-based NOR type CAM circuit according to an example embodiment requires 10 transistors and has a relatively large size compared to a general RAM, such as 6T SRAM. Therefore, production cost is high and a reduction in an area is required in a memory layout design to solve this.

Referring to FIG. 2, the 10T-based NOR type CAM circuit according to an example embodiment has a 2-by-2 memory structure and includes a first CAM cell 211, a second CAM cell 212, a third CAM cell 221, and a fourth CAM cell 222.

The first CAM cell 211 and the second CAM cell 212 share match line 1 (ML1) and word line 1 (WL1), and the third CAM cell 221 and the fourth CAM cell 222 share match line 2 (ML2) and word line 2 (WL2). Therefore, since the first CAM cell 211 and the second CAM cell 212, and the third CAM cell 221 and the fourth CAM cell 222 use different MLs and WLs, an active-to-active distance is required between the first CAM cell 211 and the second CAM cell 212 and the third CAM cell 221 and the fourth CAM cell 222.

Also, the first CAM cell 211 and the third CAM cell 221 share search line 1 (SL1) and bit line 1 (BL1), and the second CAM cell 212 and the fourth CAM cell 222 share search line 2 (SL2) and bit line (BL2). Therefore, since the first CAM cell 211 and the third CAM cell 221 and the second CAM cell 212 and the fourth CAM cell 222 use different SLs and BLs, a poly-to-poly distance is required between the first CAM cell 211 and the third CAM cell 221 and the second CAM cell 212 and the fourth CAM cell 222.

Figure 3:
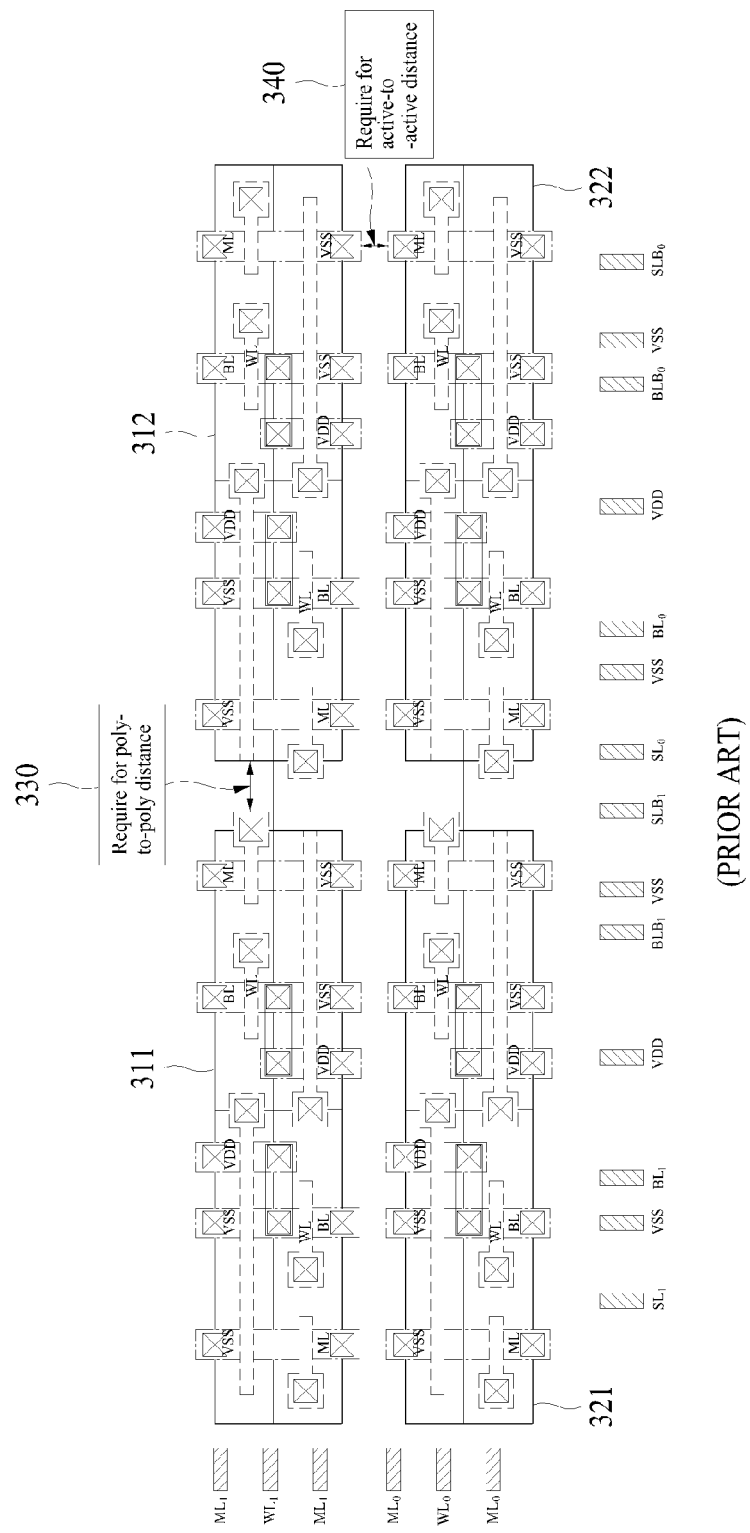
FIG. 3 illustrates a 2-by-2 memory layout design of a 10T-based NOR type CAM according to the related art.

FIG. 3 illustrates a 2-by-2 memory layout design of a 10T-based NOR type CAM according to the related art.

Referring to FIG. 3, a 10T-based NOR type CAM circuit according to an example embodiment has a 2-by-2 memory structure and includes a first CAM cell 311, a second CAM cell 312, a third CAM cell 321, and a fourth CAM cell 322.

As described above with reference to FIG. 2, the first CAM cell 311 and the second CAM cell 312 share ML1 and WL1, and the third CAM cell 321 and the fourth CAM cell 322 share ML0 and WL0. Therefore, since the first CAM cell 311 and the second CAM cell 312 use MLs and WLs different from those used by the third CAM cell 321 and the fourth CAM cell 322, an active-to-active distance 340 is required between the first CAM cell 311 and the third CAM cell 321, and between the second CAM cell 312 and the fourth CAM cell 322.

Also, the first CAM cell 311 and the third CAM cell 321 share SL1 and BL1, and the second CAM cell 312 and the fourth CAM cell 322 share SL0 and BL0. Therefore, since the first CAM cell 311 and the third CAM cell 321 use SLs and BLs different from those used by the second CAM cell 312 and the fourth CAM cell 322, a poly-to-poly distance 330 is required between the first CAM cell 311 and the third CAM cell 321 and between the second CAM cell 312 and the fourth CAM cell 322.

Therefore, proposed is a layout structure for reducing a spacing between memory cells.

Figure 4:
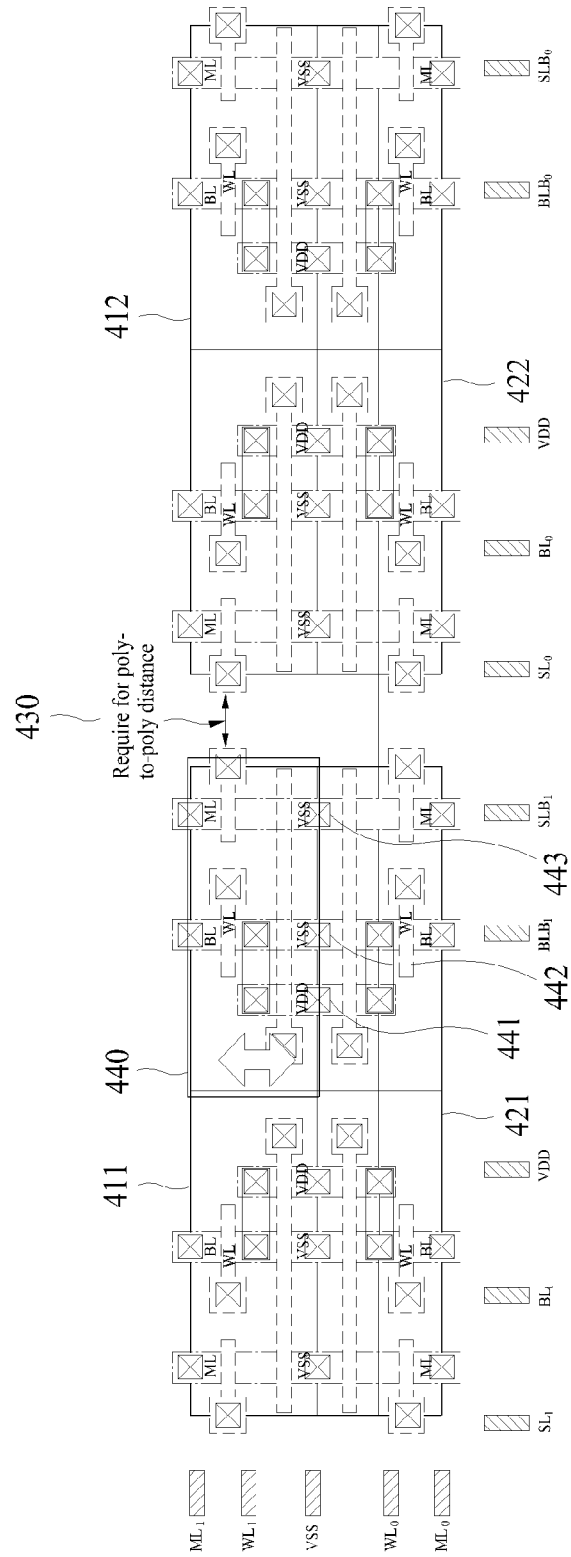
FIG. 4 illustrates an active contact share layout design according to an example embodiment.

FIG. 4 illustrates an active contact share layout design according to an example embodiment.

In FIG. 4, proposed is a layout structure for reducing an active-to-active distance according to an example embodiment.

Referring to FIG. 4, a 10T-based NOR type CAM circuit according to an example embodiment has a 2-by-2 memory structure and includes a first CAM cell 411, a second CAM cell 412, a third CAM cell 421, and a fourth CAM cell 422.

The first CAM cell 411 and the third CAM cell 421 share SL1 and BL1, and the second CAM cell 412 and the fourth CAM cell 422 share SL0 and BL0. Therefore, since the first CAM cell 411 and the third CAM cell 421 use SLs and BLs different from those used by the second CAM cell 412 and the fourth CAM cell 422, a poly-to-poly distance 430 is required between the first CAM cell 411 and the second CAM cell 412 and between the third CAM cell 421 and the fourth CAM cell 422.

In a layout structure of a 10T-based NOR type CAM according to a first example embodiment, the first CAM cell 411 and the second CAM cell 412 share ML1 and WL1 and the third CAM cell 421 and the fourth CAM cell 422 share ML0 and WL0.

An active-to-active distance is not required between the first CAM cell 411 and the third CAM cell 421 and between the second CAM cell 412 and the fourth CAM cell 422 through active contact share.

That is, describing the first CAM cell 411 as an example, when a layout of a half region 440 of the first CAM cell 411 is upside down, only VDD 441 or VSS 442, 443 is provided as contact of a memory cell, which enables active contact share with the third CAM cell 421.

Compared to the related art, a layout structure for reducing an active-to-active distance according to an example embodiment may maintain a poly-to-poly distance region as is and may reduce an active-to-active-distance between upper and lower cells and thus, may achieve an area reduction effect without other overhead.

According to an example embodiment, the area reduction effect of about 6.7% may be achieved based on a 28-nano process.

Figure 5:
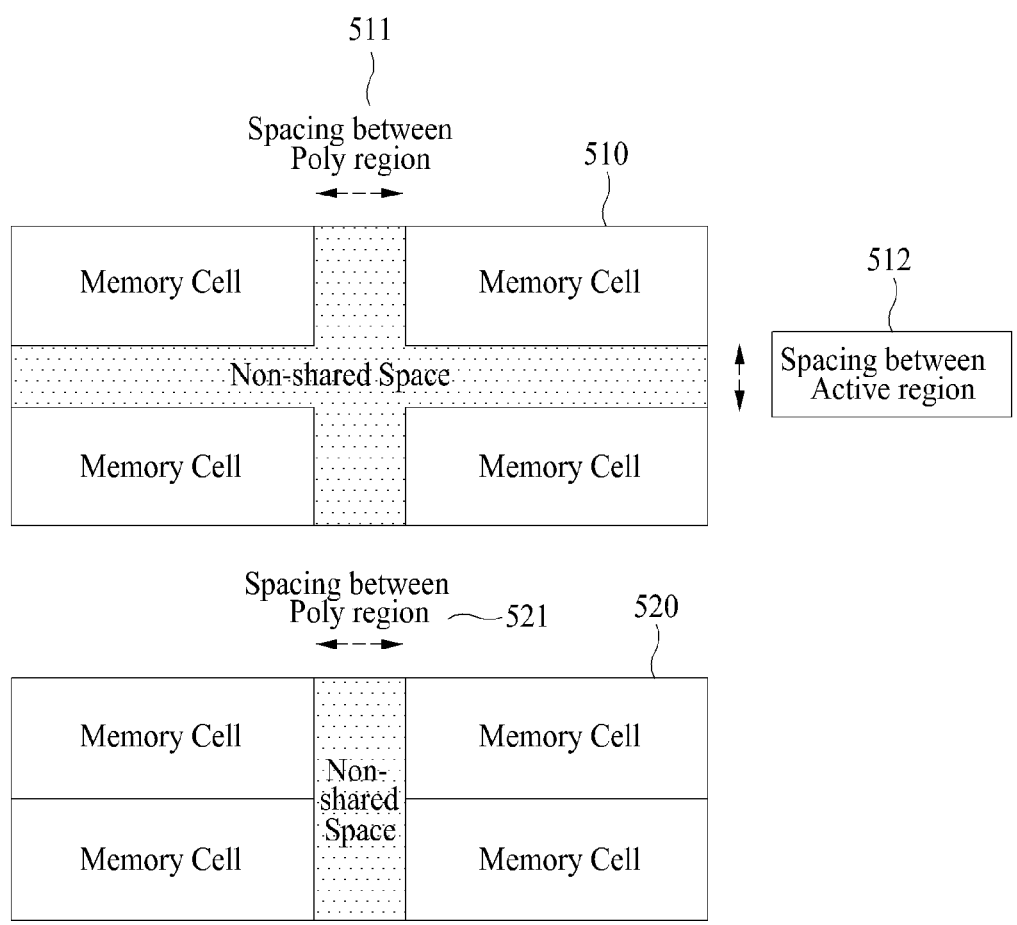
FIG. 5 illustrates an example of describing a reduction in a vertical area through active contact share according to an example embodiment.

FIG. 5 illustrates an example of describing a reduction in a vertical area through active contact share according to an example embodiment.

In a 2-by-2 memory layout design 510 of a 10T-based NOR type CAM according to the related art, an active-to-active distance 512 is required between a first CAM cell and a third CAM cell and between a second CAM cell and a fourth CAM cell, and a poly-to-poly distance 511 is required between the first CAM cell and the second CAM cell and between the third CAM cell and the fourth CAM cell.

However, in a layout design 520 of a 10T-based NOR type CAM according to the first example embodiment, a poly-to-poly distance 521 is required between a first CAM cell and a second CAM cell and between a third CAM cell and a fourth CAM cell, and an active-to-active distance is not required between the first CAM cell and the third CAM cell and between the second CAM cell and the fourth CAM cell through active contact share.

Therefore, an area reduction effect corresponding to a non-shared spacing according to active contact share may be achieved.

Figure 6:
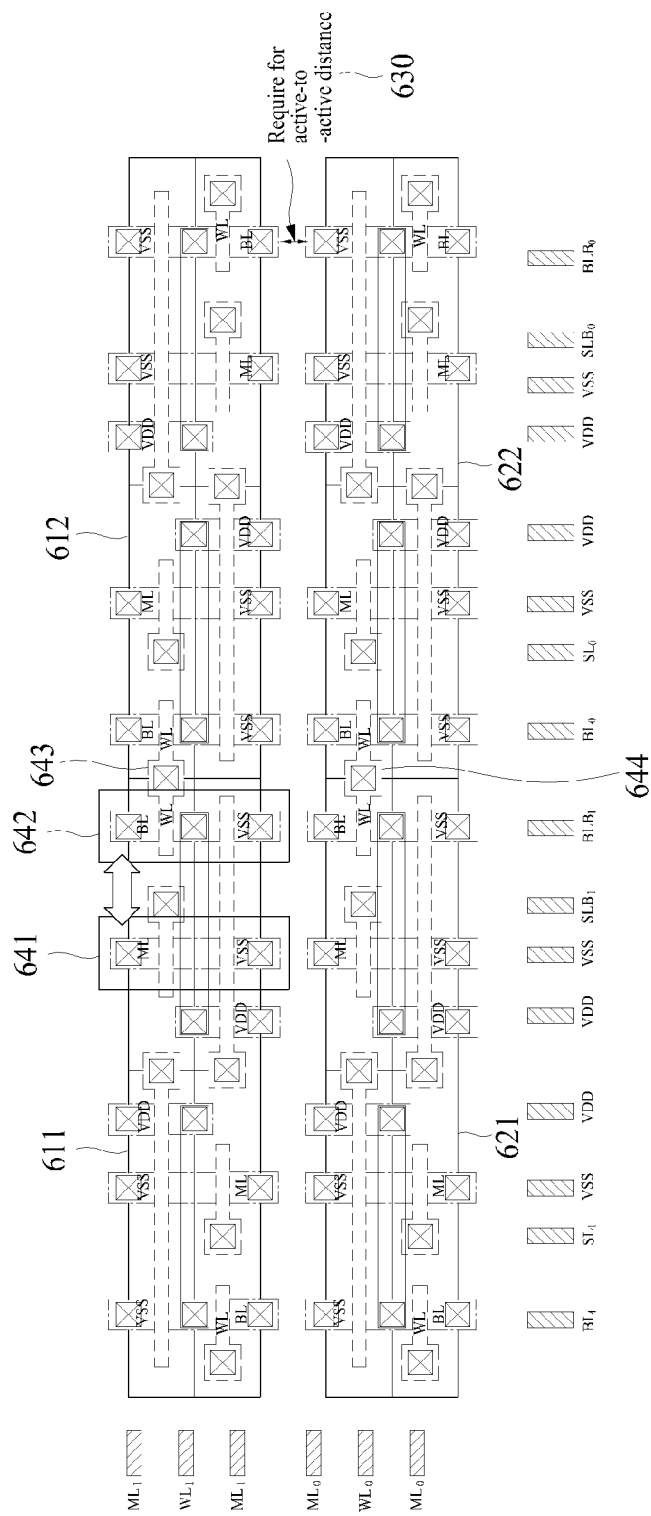
FIG. 6 illustrates a poly contact share layout design according to an example embodiment.

FIG. 6 illustrates a poly contact share layout design according to an example embodiment.

In FIG. 6, proposed is a layout structure for reducing a poly-to-poly distance according to an example embodiment.

A 10T-based NOR type CAM circuit according to an example embodiment has a 2-by-2 memory structure and includes a first CAM cell 611, a second CAM cell 612, a third CAM cell 621, and a fourth CAM cell 622.

The first CAM cell 611 and the second CAM cell 612 share ML1 and WL1, and the third CAM cell 621 and the fourth CAM cell 622 share ML0 and WL0. Therefore, since the first CAM cell 611 and the second CAM cell 612 use MLs and WLs different from those used by the third CAM cell 621 and the fourth CAM cell 622, an active-to-active distance 630 is required between the first CAM cell 611 and the third CAM cell 621 and between the second CAM cell 612 and the fourth CAM cell 622.

In a layout structure of a 10T-based NOR type CAM according to a second example embodiment, the first CAM cell 611 and the third CAM cell 621 share SL1 and BL1, and the second CAM cell 612 and the fourth CAM cell 622 share SL0 and BL0.

A poly-to-poly distance is not required between the first CAM cell 611 and the second CAM cell 612 and between the third CAM cell 621 and the fourth CAM cell 622, through poly contact share (643, 644).

That is, describing the first CAM cell 611 as an example, when a part 642 including a BL contact and a part 641 including an ML contact in the first CAM cell 611 are reversed between left and right, that is, horizontally, poly contact share 643 between the first CAM cell 611 and the second CAM cell 612 is enabled by sharing the WL contact with the second CAM cell 612.

Compared to the related art, a layout structure for reducing a poly-to-poly distance according to an example embodiment may maintain an active-to-active distance region as is and may reduce only a poly-to-poly distance between left and right cells and may achieve an area reduction effect without other overhead.

According to an example embodiment, the area reduction effect of about 6.1% may be achieved based on a 28-nano process.

Figure 7:
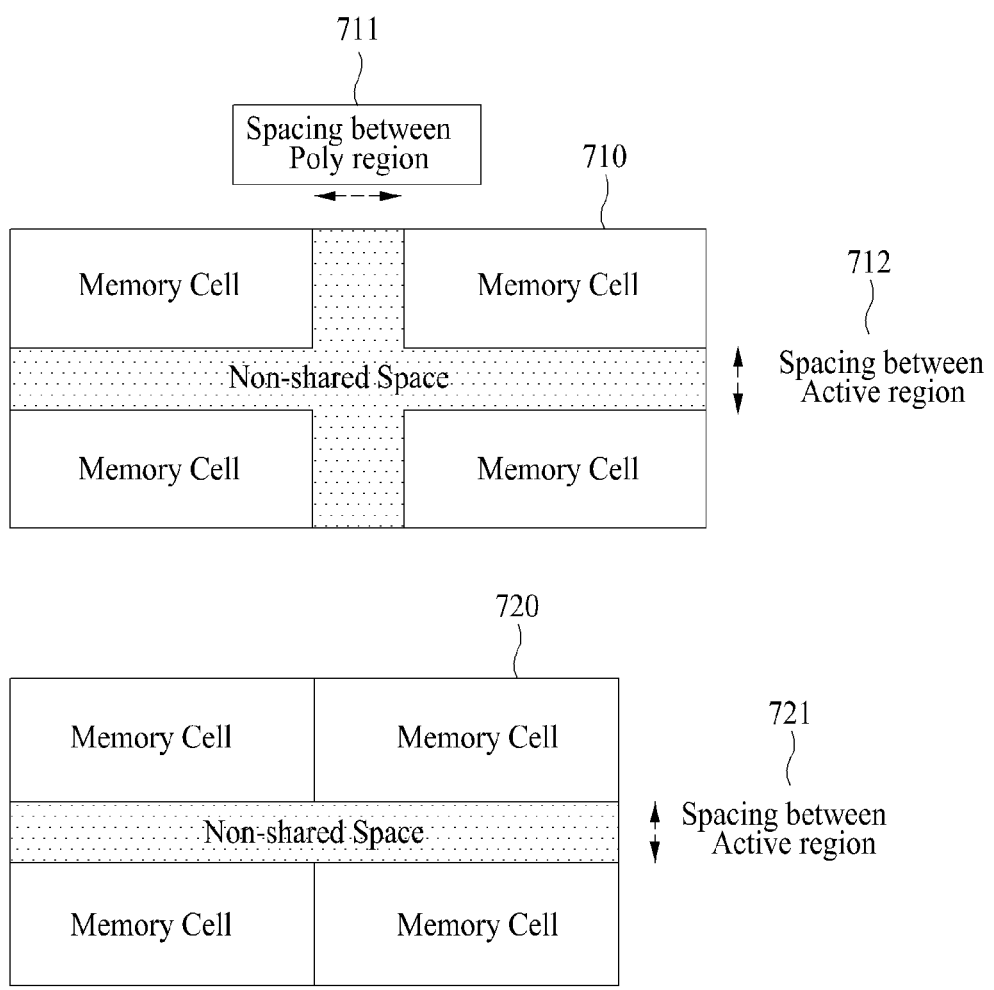
FIG. 7 illustrates an example of describing a reduction in a horizontal area through poly contact share according to an example embodiment.

FIG. 7 illustrates an example of describing a reduction in a horizontal area through poly contact share according to an example embodiment.

In a 2-by-2 memory layout design 710 of a 10T-based NOR type CAM according to the related art, an active-to-active distance 712 is required between a first CAM cell and a third CAM cell and between a second CAM cell and a fourth CAM cell, and a poly-to-poly distance 711 is required between the first CAM cell and the third CAM cell and between the second CAM cell and the fourth CAM cell.

However, in a layout design 720 of a 10T-based NOR type CAM according to the second example embodiment, only an active-to-active distance 721 is required between a first CAM cell and a third CAM cell and between a second CAM cell and a fourth CAM cell, and a poly-to-poly distance is not required between the first CAM cell and the second CAM cell and between the third CAM cell and the fourth CAM cell through poly contact share.

Therefore, an area reduction effect corresponding to a non-shared spacing according to poly contact share may be achieved.

Figure 8:
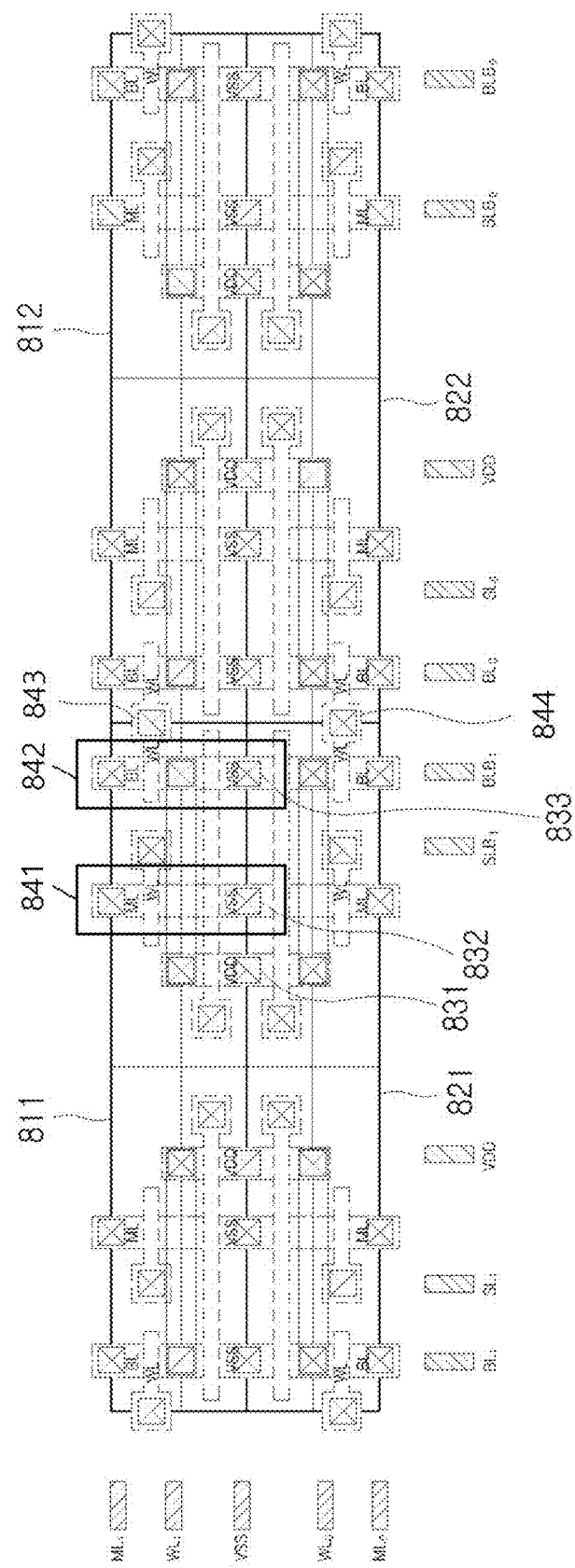
FIG. 8 illustrates an active contact share and poly contact share layout design according to an example embodiment.

FIG. 8 illustrates an active contact share and poly contact share layout design according to an example embodiment.

In FIG. 8, proposed is a layout structure for reducing all of an active-to-active distance and a poly-to-poly distance according to an example embodiment.

A 10T-based NOR type CAM circuit according to an example embodiment has a 2-by-2 memory structure and includes a first CAM cell 811, a second CAM cell 812, a third CAM cell 821, and a fourth CAM cell 822.

In a layout structure of a 10T-based NOR type CAM according to a third example embodiment, the first CAM cell 811 and the second CAM cell 812 share ML1 and WL1, and the third CAM cell 821 and the fourth CAM cell 822 share ML0 and WL0.

An active-to-active distance is not required between the first CAM cell 811 and the third CAM cell 821 and between the second CAM cell 812 and the fourth CAM cell 822 through active contact share.

That is, describing the first CAM cell 811 as an example, when a layout of a half region of the first CAM cell 811 is upside down, VDD 831 or VSS 832, 833 is provided as a contact of a memory cell, which enables active contact share with the third CAM cell 821.

Also, in a layout structure of a 10T-based NOR type CAM according to a third example embodiment, the first CAM cell 811 and the third CAM cell 821 share SL1 and BL1, and the second CAM cell 812 and the fourth CAM cell 822 share SL0 and BL0.

A poly-to-poly distance is not required between the first CAM cell 811 and the second CAM cell 812 and between the third CAM cell 821 and the fourth CAM cell 822 through poly contact share (843, 844).

That is, describing the first CAM cell 811 as an example, when a part 842 including a BL contact and a part 841 including an ML contact in the first CAM cell 811 are horizontally reversed, poly contact share (843, 844) between the first CAM cell 811 and the second CAM cell 812 is enabled by sharing the WL contact with the second CAM cell 812.

Compared to the Related Art, a Layout Structure for Reducing all of an Active-to-Active Compared to the related art, a layout structure for reducing all of an active-to-active distance and a poly-to-poly distance according to an example embodiment may reduce all of an active-to-active distance between upper and lower cells and a poly-to-poly distance between left and right cells and may achieve an area reduction effect without other overhead.

According to an example embodiment, the area reduction effect of about 16.2% may be achieved based on a 28-nano process.

Figure 9:
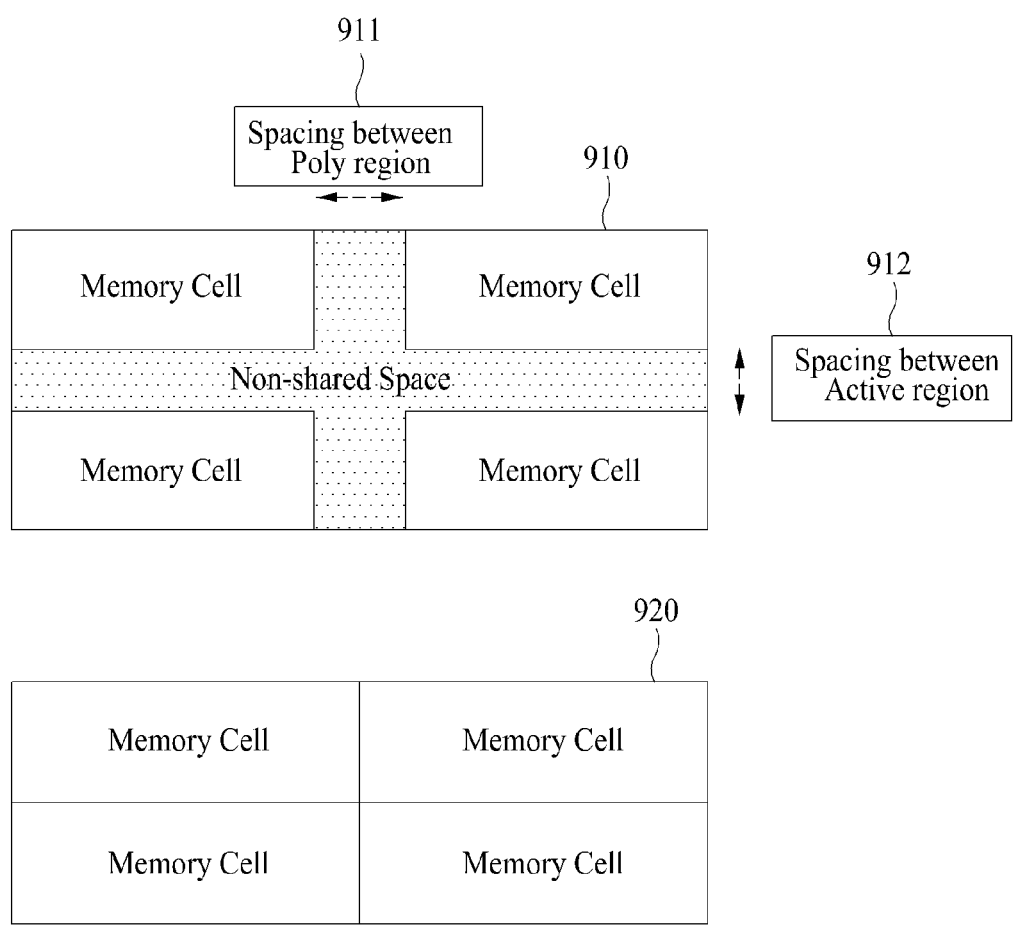
FIG. 9 illustrates an example of describing a reduction in a vertical area and a horizontal area through active contact share and poly contact share according to an example embodiment.

FIG. 9 illustrates an example of describing a reduction in a vertical area and a horizontal area through active contact share and poly contact share according to an example embodiment.

In a 2-by-2 memory layout design 910 of a 10T-based NOR type CAM according to the related art, an active-to-active distance 912 is required between a first CAM cell and a third CAM cell and between a second CAM cell and a fourth CAM cell, and a poly-to-poly distance 911 is required between the first CAM cell and the third CAM cell and between the second CAM cell and the fourth CAM cell.

In a layout design 920 of a 10T-based NOR type CAM according to the third example embodiment, an active-to-active distance is not required between the first CAM cell and the third CAM cell and between the second CAM cell and the fourth CAM cell through active contact share and a poly-to-poly distance is not required between the first CAM cell and the third CAM cell and between the second CAM cell and the fourth CAM cell through poly contact share.

Therefore, an area reduction effect corresponding to a non-shared spacing according to active contact share and poly contact share may be achieved.

FIGS. 10A, 10B, 10C, and 10D illustrate examples of comparing the related art and a reduction in an area through active contact share and poly contact share according to an example embodiment.

Figure 10A:
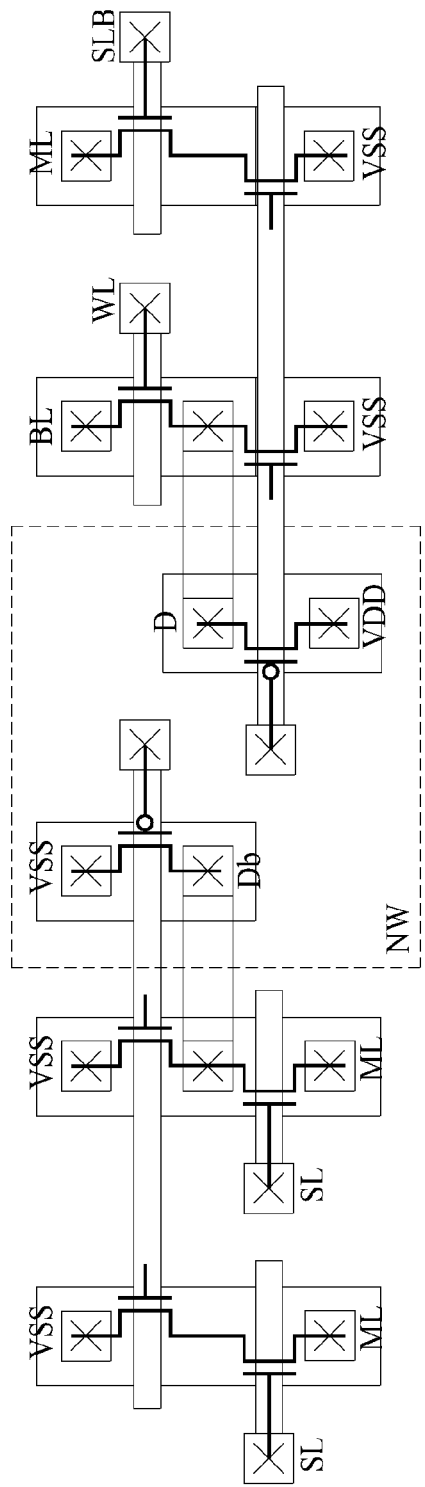
FIGS. 10A, 10B, 10C, and 10D illustrate an example of comparing the related art and a reduction in an area through active contact share and poly contact share according to an example embodiment.

FIG. 10A illustrates an example of comparing a memory layout area of a 1-by-1 cell based on a 28-nano process according to the related art.

Figure 10B:
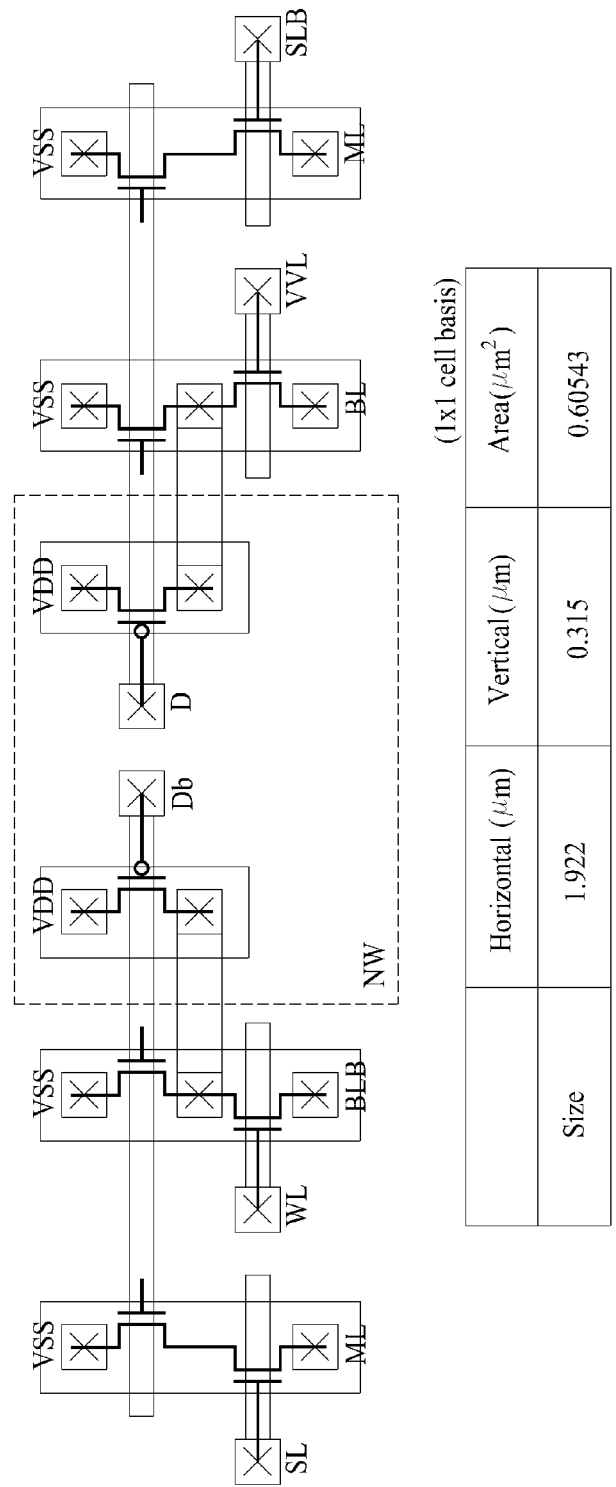

FIG. 10B illustrates an example of comparing a memory layout area of a 1-by-1 cell based on a 28-nano process through active contact share according to the first example embodiment.

Figure 10C:
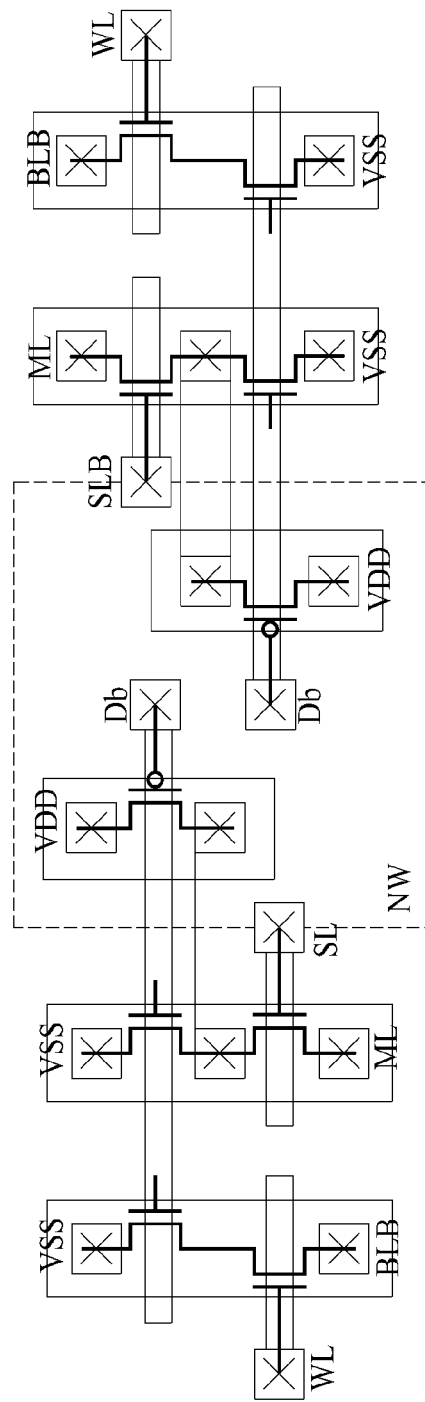

FIG. 10C illustrates an example of comparing a memory layout area of a 1-by-1 cell based on a 28-nano process through poly contact share according to the second example embodiment.

Figure 10D:
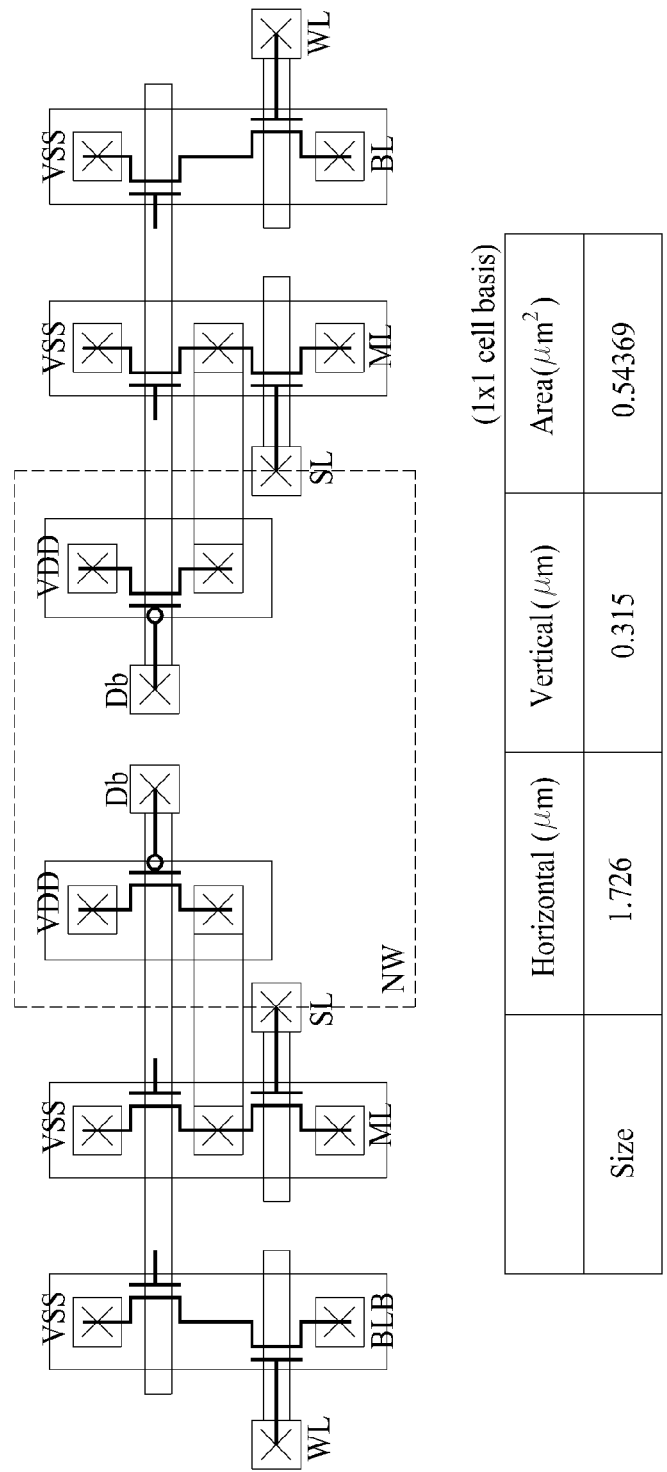

FIG. 10D illustrates an example of comparing a memory layout area of a 1-by-1 cell based on a 28-nano process through active contact share and poly contact share according to the third example embodiment.

Referring to FIGS. 10A to 10D, it can be seen that an area reduction effect corresponding to a non-shared spacing is achieved when only active contact share is applied, when only poly contact share is applied, and when all of active contact share and poly contact share are applied.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A layout structure of a content addressable memory (CAM) comprising a first CAM cell, a second CAM cell, a third CAM cell, and a fourth CAM cell, wherein:

the first CAM cell and the third CAM cell share search line 1 (SL1) and bit line 1 (BL1), and the second CAM cell and the fourth CAM cell share search line 0 (SL0) and bit line 0 (BL0), the first CAM cell and the second CAM cell share match line 1 (ML1) and word line 1 (WL1), and the third CAM cell and the fourth CAM cell share match line 0 (ML0) and word line 0 (WL0), wherein a first-1 region among the first-1 region and a first-2 region that together constitute the first CAM cell and a third-2 region corresponding to the first-2 region among a third-1 region and the third-2 region that together constitute the third CAM cell are inverted vertically, and a second-1 region among the second-1 region and a second-2 region that together constitute the second CAM cell and a fourth-2 region corresponding to the second-2 region among a fourth-1 region and the fourth-2 region that together constitute the fourth CAM cell are inverted vertically, whereby VDD contacts and VSS contacts are shared at first boundaries between the first CAM cell and the third CAM cell and between the second CAM cell and the fourth CAM cell, the first boundaries representing boundaries between CAM cells arranged in a vertical direction in the layout structure, an active contact is shared between the first CAM cell and the third CAM cell and another active contact is shared between the second CAM cell and the fourth CAM cell, and an active-to-active distance is not required between the first CAM cell and the third CAM cell and between the second CAM cell and the fourth CAM cell, and wherein each of the said regions has a word line (WL) contact and a search line (SL) contact such that the arrangement of these two contacts in each region is inverted horizontally relative to the arrangement of the WL and SL contacts, respectively, in the other region with which together constitute a respective CAM cell, whereby WL contacts are shared at second boundaries between the first CAM cell and the second CAM cell and between the third CAM cell and the fourth CAM cell, the second boundaries representing boundaries between CAM cells arranged in a horizontal direction in the layout structure, a poly contact is shared between the first CAM cell and the second CAM cell and another poly contact is shared between the third CAM cell and the fourth CAM cell, and a poly-to-poly distance is not required between the first CAM cell and the second CAM cell and between the third CAM cell and the fourth CAM cell.

* * * * *